United States Patent Office 3,577,461
Patented May 4, 1971

3,577,461
α-PROPARGYLAMINO-PROPIO-PHENONES AND THE SALTS THEREOF
Edward John Warawa, 2575 N. 37th St., and John Hans Biel (522 Green Bay Road, Lake Bluff, Ill.), both of Milwaukee, Wis. 53210
No Drawing. Filed Oct. 10, 1968, Ser. No. 766,626
Int. Cl. C07c 97/10
U.S. Cl. 260—570.5
9 Claims

ABSTRACT OF THE DISCLOSURE

α-Propargylaminopropiophenone derivatives of the formula

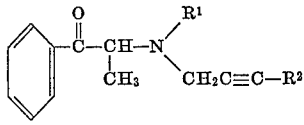

wherein $R^1$ is (lower)alkyl, (lower)alkenyl, (lower)alkynyl, benzyl, cyclopropyl or cyclopropylmethyl and $R^2$ is hydrogen, (lower)alkyl, phenyl or benzyl; and the pharmaceutically acceptable nontoxic salts thereof exhibit central nervous system stimulant activity and anorexic activity and are useful as central nervous system stimulants and to inhibit appetite in mammals.

BACKGROUND OF THE INVENTION (1) Field of the invention

This invention relates to novel compounds exhibiting central nervous system stimulant and anorexic activity which are useful as central nervous system stimulants and anorexic agents in mammals.

(2) Description of the prior art

An object of the present invention is to provide novel compounds which will cause loss of appetite in mammals and also will stimulate the central nervous system of mammals. While some compounds having such activities are known in the art there is a need for pharmaceutical products having improved properties.

SUMMARY OF THE INVENTION

This invention comprises the provision of compounds having the formula

I 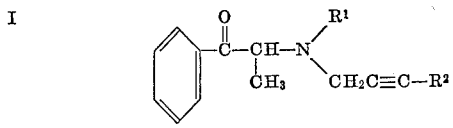

wherein $R^1$ is a member selected from the group consisting of (lower)alkyl, (lower)alkenyl, (lower)alkynyl, benzyl, cyclopropyl and cyclopropylmethyl and $R^2$ is a member selected from the group consisting of hydrogen, (lower)alkyl, phenyl and benzyl; and the pharmaceutically acceptable nontoxic salts thereof.

The pharmaceutically acceptable nontoxic salts include the organic and inorganic acid addition salts, e.g., those prepared from acids such as hydrochloric, sulfuric, sulfonic, tartaric, fumaric, hydrobromic, hydroiodic, glycolic, citric, maleic, phosphoric, succinic, acetic and the like. Such salts are prepared by conventional methods by reacting the free base with the desired acid on about an equimolar basis.

The term "(lower)alkyl" as used herein means both straight and branched chain alkyl radicals containing from 1 to 8 carbon atoms, e.g., methyl, ethyl, propyl, isopropyl, butyl, isobutyl, t-butyl, amyl, hexyl, 2-ethylhexyl, etc.

The term "(lower)alkenyl" as used herein means both straight and branched chain alkenyl radicals containing from 2 to 8 carbon atoms, e.g., ethenyl, allyl, 1-propenyl, 1-butenyl, 3-butenyl, 2-methyl-1-propenyl, 3-pentenyl, 1-hexenyl, 7-octenyl, etc.

The term "(lower)alkynyl" as used herein means both straight and branched chain alkynyl radicals containing from 2 to 8 carbon atoms, e.g., ethinyl, propargyl, 1-butinyl, 2-butinyl, 1,1-dimethylpropargyl, 1-pentinyl, 1-heptinyl, etc.

A preferred embodiment of the present invention consists of compounds of the formula II 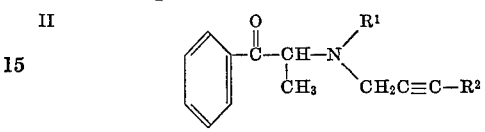

wherein $R^1$ is (lower)alkyl and $R^2$ is hydrogen or (lower)alkyl (preferably 1 to 2 carbon atoms).

A more preferred embodiment of the present invention consists of compounds of the formula III 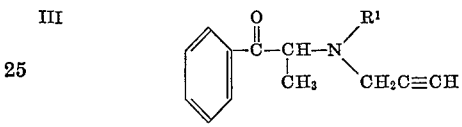

wherein $R^1$ is (lower)alkyl.

The compounds of this invention may be prepared as exemplified below by reacting an α-halopropiophenone of the formula IV 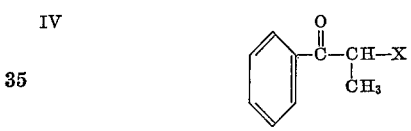

wherein X is chloro or bromo but preferably bromo with at least an equimolar weight of an acetylenic amine of the formula V 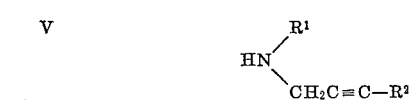

wherein $R^1$ and $R^2$ are as previously defined. The reaction is carried out in a nonreactive solvent, e.g., ethanol, methanol, isopropanol, benzene, ether, dimethylformamide and the like at a temperature of from about −5 to about 100° C. and most preferably at about ambient temperature.

The starting materials used to prepare the compounds of this invention are either well known in the art, or easily prepared in accordance with standard organic procedures previously described in the literature.

The acetylenic amines of Formula V are prepared for example by the reaction of an acetylenic halide, preferably a chloride, of the formula VI 

wherein X and $R^2$ are as previously described with a primary amine of the formula

VII $R^1NH_2$ wherein $R^1$ is as previously defined according to the procedure described by Peters and Hennion, J. Med. Chem. 7, 390 (1964).

Alternatively the acetylenic amines of Formula V are conveniently prepared at atmospheric pressure by the gradual addition of an acetylenic halide (preferably the chloride) of Formula VI to a large molar excess of a primary amine of Formula VII. The reaction is carried out at about the boiling point of the amine. For example when methylamine is employed in the process the reaction is carried out at a temperature of about −16° C.

The compounds of this invention possess central nervous system stimulant activity and anorexic activity making them useful as central nervous system stimulants and to inhibit appetite in mammals to effect loss in weight.

The compounds of this invention were tested for central nervous system stimulant activity in the mouse and monkey. The compounds were administered at various doses p.o. and the animals observed for increased motor activity. When the example the preferred compound of this invention α-N-methyl-N-propargylaminopropiophenone hydrochloride was tested it produced significant central nervous system stimulant activity at doses as low as 5–10 mg./kg. in the mouse and 1 mg./kg. in the monkey. The compound had an oral isolated $LD_{50}$ of 199 mg./kg. an oral grouped $LD_{50}$ of 133 mg./kg. in the mouse.

The compounds of this invention were tested for anorexic activity in the mouse anorexia assay. In the mouse anorexia assay, the preferred compound of the present invention, α - N-methyl-N-propargylaminopropiophenone hydrochloride was effective at a dose as low as 10 mg./kg. p.o. In this assay, groups of five mice, starved for 16–17 hours, are placed in a cage, given the drug to be tested, and after another thirty minutes are given a weighed amount of food. One hour after presenting the food, the food dish is removed and weighed. Control mice, i.e., dosed with water, eat an average of 6.2 gm. per group of five mice. Significant anorexic activity is exhibited when a group of five treated mice eat less than 2 mg. in the hour. In various tests, the preferred compound of the present invention reduced the food intake to amounts in the range of 0–2 gm. at an oral dosage as low as 10 mg./kg. The preferred compound was also tested for anorexic activity in the rate, dog and monkey, exhibiting a minimal effective dose (M.E.D.) of 5–10 mg./kg., 5 mg./kg. and 2 mg./kg. in the rate, dog and monkey respectively.

The compounds of this invention may be administered as the free bases or in the form of their nontoxic addition salts. They may be compounded and formulated into pharmaceutical preparations in unit dosage form for oral or parenteral administration with organic or inorganic solid materials or liquids which are pharmaceutically acceptable carriers. Some examples of the carriers which can be used are gelatin capsules, sugars, cellulose derivatives such as carboxymethylcellulose, gelatin, talc, magnesium stearate, vegetable oil such as peanut oil, etc., liquid petroleum, glycerin, sorbitol, ethanol, agar, elixirs, syrups and water including sterile water. The composition may take the form of tablets, powders, granules, capsules, suspensions, solutions, and the like.

The compounds of this invention when administered orally or paraenterallykα
orally or parenterally in a central nervous system stimulant or appetite inhibiting amount are effective in stimulating the central nervous system of mammals and inhibiting appetite in mammals. An oral dosage range of about 1 to about 50 milligrams per kilogram per day is convenient for inhibiting appetite of mammals and also for stimulating the central nervous system and preferably about 10 to 50 milligrams per kilogram per day, which may be administered in divided dosage, e.g., two, three or four times a day. Administration of the compounds is conveniently begun at the minimal effective dose (M.E.D.) or $ED_{50}$ of the particular compound in the particular species of mammal. However, in general, the particular dosage most suitable for a particular application, as might be expected, will vary with the age, weight and general health of the mamman under treatment and the degree of central nervous system stimulant or anorexic effect required. After taking into consideration these factors and any other factors to be considered, one skilled in the art of treating diseases of mammals can readily determine the appropriate dosage.

The following examples are intended ot illustrate the invention described herein without unduly restricting it.

EXAMPLE 1

Preparation of α-N-methyl-N-propargylaminopropiophenone hydrochloride

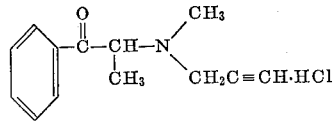

α-bromopropiophenone, 2.5 g. (0.0115 M), and N-methyl-N-propargylamine, 3.45 g. (0.05 M) were mixed in 15 ml. of ethanol and stirred overnight at room temperature. Removal of solvent in vacuo left an oil which was diluted with water, treated with potassium carbonate and extracted with ether. The aqueous phase was again extracted with ether and the combined ether extracts were washed with water and dried with magnesium sulfate. Filtration and removal of solvent yielded a residue, α-N-methyl-N-propargylaminopropiophenone which was distilled in the Kugelrohr to yield 2.2 g., B.P. 97–105° C./0.1 mm.

$_{max.}^{FILM}$ 3.03 (s.), 4.74 (w.), 5.95 (s.) μ

This material was dissolved in ether and treated with anhydrous HCl to yield 2.2 g. of the crude hydrochloride. Recrystallization from ethanol-ether gave 1.85 g. α-N-methyl-N - propargylaminopropiophenone hydrochloride, M.P. 184–186° C., which was dried in a Drying Pistol without heating to give the analytical specimen M.P. 188–189° C.

$_{max.}^{Nujol}$ 3.11 (m.), 4.03 (s.), 4.70 (w.), 5.92 (s.) μ

*Analysis.*—Calc'd. for $C_{13}H_{16}NOCl$ (percent) C, 65.68; H, 6.79; N, 5.90; Cl, 14.92. Found (percent): C, 65.84; H, 6.67; N, 5.87; Cl, 14.82.

EXAMPLE 2

When in the procedure of Example 1, N-methyl-N-propargylamine is replaced by an equal molar amount of N-methyl-N-(2-butinyl)amine,
N-methyl-N-(3-phenyl-2-propinyl)amine,
N-methyl-N-(4-phenyl-2-butinyl)amine,
N-ethyl-N-propargylamine,
N-isopropyl-N-propargylamine,
N-allyl-N-propargylamine,
N-cyclopropyl-N-propargylamine,
N-cyclopropylmethyl-N-propargylamine,
N-benzyl-N-propargylamine,
N-ethenyl-N-propargylamine,
N-(1-butenyl)-N-propargylamine,
N-(2-pentinyl)-N-propargylamine,
N-ethinyl-N-propargylamine,
N-butyl-N-propargylamine,
N-hexyl-N-propargylamine,
N-(2-propenyl)-N-propargylamine,
N-methyl-N-(2-pentinyl)amine,
N-methyl-N-(2-hexinyl)amine,
N-methyl-N-(2-heptinyl)amine,
α-ethyl-N-(2-butinyl)amine,
N-allyl-N-(2-pentinyl)amine, and
N-cyclopropyl-N-(2-butinyl)amine, there are obtained, α-N-methyl-N-(2-butinyl)aminopropiophenone,
α-N-methyl-N-(3-phenyl-2-propionyl)aminopropiophenone,
α-N-methyl-N-(4-phenyl-2-butinyl)aminopropiophenone,
α-N-ethyl-N-propargylaminopropiophenone,
α-N-isopropyl-N-proparglyaminopropiophenone,
α-N-allyl-N-propargylaminopropiophenone,
α-N-cyclopropyl-N-propargylaminopropiophenone, α-N-cyclopropylmethyl-N-propargylaminopropiophenone,
α-N-benzyl-N-propargylaminopropiophenone,
α-N-ethenyl-N-propargylaminopropiophenone,
α-N-(1-butenyl)-N-propargylaminopropiophenone,
α-N-(2-pentinyl)-N-propargylaminopropiophenone,
α-N-ethinyl-N-propargylaminopropiophenone,
α-N-butyl-N-propargylaminopropiophenone,
α-N-hexyl-N-propargylaminopropiophenone,
α-N-(2-propenyl)-N-propargylaminopropiophenone,
α-N-methyl-N-(2-pentinyl)aminopropiophenone,
α-N-methyl-N-(2-hexinyl)aminopropiophenone,
α-N-methyl-N-(2-heptinyl)aminopropiophenone,
α-N-ethyl-N-(2-butinyl)aminopropiophenone,
α-N-allyl-N-(2-pentinyl)aminopropiophenone, and
α-N-cyclopropyl-N-(2-butinyl)aminopropiophenone,
respectively.

While this invention has been described and exemplified in terms of its preferred embodiment, those skilled in the art will appreciate that modifications can be made without departing from the spirit and scope of the invention.

We claim:

1. A compound selected from the group consisting of compounds of the formula

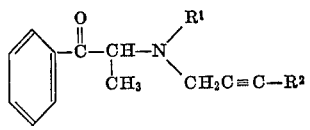

wherein R¹ is a member selected from the group consisting of (lower)alkyl, (lower)alkenyl, (lower)alkynyl, benzyl, cyclopropyl and cyclopropylmethyl and R² is a member selected from the group consisting of hydrogen, (lower)alkyl, phenyl and benzyl; and the pharmaceutically acceptable nontoxic salts thereof.

2. A compound of claim 1 having the formula

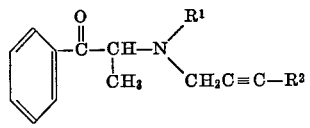

wherein R¹ is (lower)alkyl and R² is a member selected from the group consisting of hydrogen and (lower)alkyl.

3. A compound of claim 1 having the formula

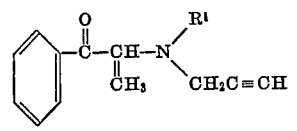

wherein R¹ is (lower)alkyl.

4. The compound of claim 1 having the formula

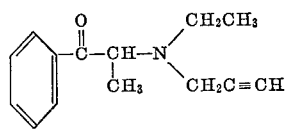

5. The compound of claim 1 having the formula

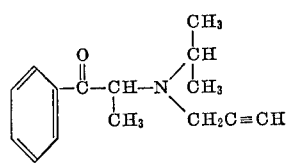

6. The compound of claim 1 having the formula

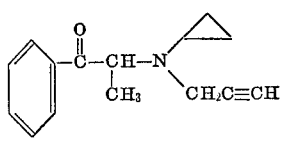

7. The compound having the formula

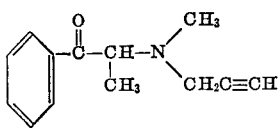

8. The pharmaceutically acceptable nontoxic salts of the compound of claim 7.

9. The compound having the formula

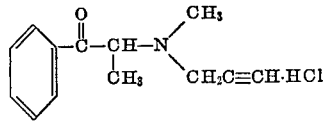

References Cited
FOREIGN PATENTS
1,170,348  11/1969  Great Britain _____ 260—570.5

ROBERT V. HINES, Primary Examiner

U.S. Cl. X.R.
260—501.17, 501.18, 563, 570.8, 570.9, 583, 592, 654; 424—330